US006899451B2

(12) United States Patent
Kittelmann et al.

(10) Patent No.: US 6,899,451 B2
(45) Date of Patent: May 31, 2005

(54) OPTICAL SYSTEM FOR A FRESNEL LENS LIGHT, ESPECIALLY FOR A SPOTLIGHT OR FLOODLIGHT

(75) Inventors: Ruediger Kittelmann, Einbeck (DE); Harry Wagener, Alfeld (DE)

(73) Assignee: Schott Glas, Mainz (DE)

(*) Notice: Subject to any disclaimer, the term of this patent is extended or adjusted under 35 U.S.C. 154(b) by 0 days.

(21) Appl. No.: 10/096,887

(22) Filed: Mar. 13, 2002

(65) Prior Publication Data

US 2003/0063466 A1 Apr. 3, 2003

(30) Foreign Application Priority Data

Mar. 16, 2001 (DE) ........................................ 101 13 385

(51) Int. Cl.[7] .................................................. B60Q 1/08

(52) U.S. Cl. ........................ 362/538; 362/296; 362/305; 362/388; 362/340; 362/335; 362/308; 362/309

(58) Field of Search ................................ 362/538, 296, 362/305, 388, 340, 335, 308, 309

(56) References Cited

U.S. PATENT DOCUMENTS 3,428,800 A * 2/1969 Levin et al. ................ 362/309
6,123,436 A * 9/2000 Hough et al. ............... 362/296
6,386,743 B1 * 5/2002 Futami et al. .............. 362/516

FOREIGN PATENT DOCUMENTS

DE 34 13 310 A1 10/1985
DE 39 19 643 A1 1/1991

* cited by examiner

*Primary Examiner*—Sandra O'Shea
*Assistant Examiner*—Bertrand Zeade
(74) *Attorney, Agent, or Firm*—Michael J. Striker

(57) ABSTRACT

The optical system for the Fresnel lens light has an ellipsoidal reflector (1), a light source (2) and a Fresnel lens (3). The distance (a) between the Fresnel lens (3) and the reflector (1) is changeable but is related to the changeable distance (b) between the light source (2) and the reflector (1) so that the aperture angle of the propagated light beam is variable but illumination intensity of the propagated light is maintained uniform. Surfaces of the at least one Fresnel lens and/or the reflector can be structured to provide more uniform illumination of a given area. The optical system is useful for lights for film, stage, studio and photography.

17 Claims, 2 Drawing Sheets

OPTICAL SYSTEM FOR A FRESNEL LENS LIGHT, ESPECIALLY FOR A SPOTLIGHT OR FLOODLIGHT

BACKGROUND OF THE INVENTION

1. Field of the Invention

The present invention relates to an optical system for a Fresnel lens light, particularly a spotlight or floodlight, with an ellipsoidal reflector, a light source and at least one Fresnel lens and to a Fresnel lens light with the optical system.

2. Description of the Related Art

Conventional optical systems for Fresnel lens lights include a light source, a Fresnel lens and spherical auxiliary reflector as the lighting engineering relevant parts. The filament of the light source is located substantially unchanged at the focal point of the spherical auxiliary reflector. Because of that a portion of the light radiated from the light source is reflected back to it and assists the light to the front of the light. The Fresnel lens focuses the light radiated in the front direction. The extent of the focusing depends on the distance between the Fresnel lens and the light source. If the filament is located at the focal point of the Fresnel lens, the narrowest light beam is produced or propagated. In that case a quasi-parallel beam, also known as a spotlight, is obtained. By shortening the distance between the Fresnel lens and the light source, the aperture angle of the propagated light beam continuously increases. In that case a divergent beam, also called a floodlight, is obtained.

This type of light has the disadvantage of a poor light efficiency, especially in the case of the spotlight, since the Fresnel lens receives light from the light source only over a comparatively small angular range. Furthermore it is disadvantageous that a large part of the light reflected by the spherical reflector impinges on the filament of the light source, is absorbed there and further heats the filament.

SUMMARY OF THE INVENTION

It is an object of the present invention to provide an improved optical system for a Fresnel lens light with an improved light efficiency, especially for spotlights and floodlights, while maintaining the uniformity of the light intensity in the illuminated areas.

The optical system for the Fresnel lens light according to the invention comprises an ellipsoidal reflector, a light source and at least one Fresnel lens, wherein a distance between the at least one Fresnel lens and the reflector has a definite relationship to the distance between the light source and the reflector, which is determined by a predetermined or preselected aperture angle of a light beam propagated from the light.

A clearly improved light efficiency, especially for spotlight and floodlight applications, is achieved according to the optical system of the invention. At the same time the uniformity of the light intensity in the illuminated areas is maintained, especially according to preferred embodiments.

According to the invention the ellipsoidal reflector is provided with a greater aperture. Spotlight is obtained when the filament of the light source is arranged at a first focal point of the ellipsoidal reflector closest to the reflector vertex. The light reflected by the reflector is then nearly completely focused at the second focal point of the ellipsoidal reflector that is furthest from the reflector vertex. The filament located at the first focal point that is closest to the reflector is imaged at the second focal point remote from the reflector. Thus reflected light does not impinge on the filament. The Fresnel lens is then positioned so that the focal point of the Fresnel lens coincides with the second focal point of the ellipsoidal reflector. The Fresnel lens receives nearly all of the light reflected by the reflector by means of an appropriate selection of the aperture angles of the reflector and the Fresnel lens. The Fresnel lens then produces a forwardly directed spotlight. The light efficiency or yield is considerably greater than with conventional optical systems for Fresnel lens lights.

The aperture angle of the light beam propagated from the Fresnel lens can be increased arbitrarily, when the position of the light source is changed in relation to the reflector and the distance of the Fresnel lens to the reflector is changed in a suitable manner. So that the good properties of the conventional Fresnel lens light in regard to the uniformity of the light intensity can be maintained, these spacing or distance changes must occur under suitable constraints.

According to one embodiment of the invention the ellipsoidal reflector is made of a metallic or transparent material. Preferably glass and polymeric materials are used. One of both surfaces of the reflector is provided with a system of thin layers in order to make a reflective surface. Because of this feature visible portions of the incident radiation are reflected but portions of the incident radiation outside of the visible range, especially heat radiation, pass through the reflector.

In a preferred embodiment of the optical system the light-reflecting surface of the ellipsopidal reflector is structured to scatter light and no, one or two surfaces of the Fresnel lens are structured to scatter light. The illumination intensity in the illuminated areas is more uniform because of this sort of structuring.

In an alternative preferred embodiment of the optical system for a Fresnel lens at least one of the surfaces of the Fresnel lens is structured to scatter light and the light-reflecting surface of the reflector is not structured to scatter light. The illumination intensity in the illuminated areas is more uniform because of this sort of structuring.

The optical system according to the invention is useful in lights for film, stage, studio and photography.

BRIEF DESCRIPTION OF THE DRAWING

The objects, features and advantages of the invention will now be described in more detail with the aid of the following description of the preferred embodiments, with reference to the accompanying figures in which.

DETAILED DESCRIPTION OF THE INVENTION

Figure 1:
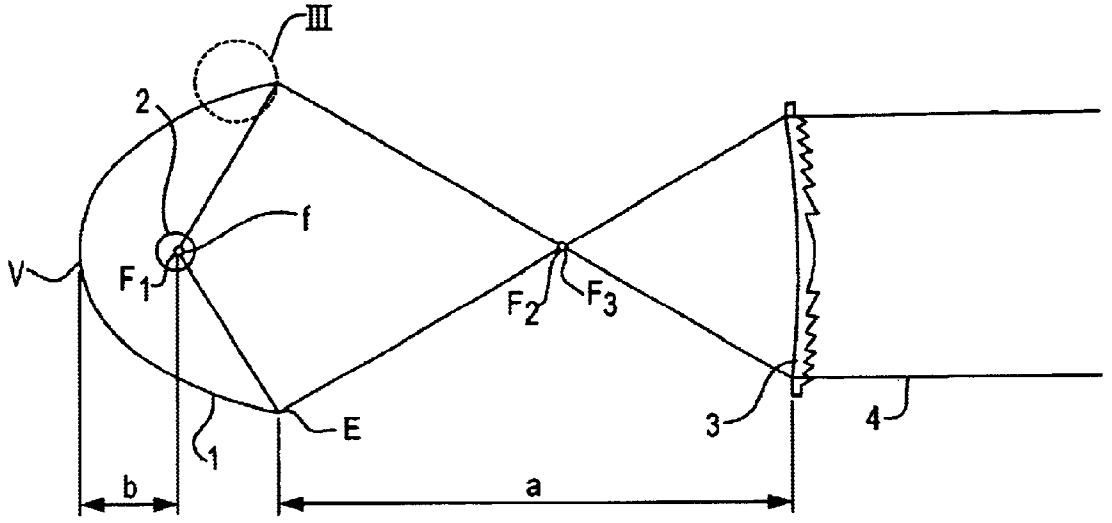
FIG. 1 is a schematic cross-sectional view of one embodiment of an optical system for a Fresnel lens light, which produces a spotlight.

FIG. 1 shows an optical system according to the invention for a Fresnel lens light that is arranged to produce a spotlight. This optical system includes an ellipsoidal reflector 1 a light source 2 and a Fresnel lens 3. The light beam propagated from the light is shown schematically. The distance a between the Fresnel lens 3 and the front edge E of the reflector 1 and the distance b between the light source 2 and the vertex V of the reflector 1 are shown in the drawing. The spotlight configuration is set up when the filament f of the light source 2 is arranged at the first focal point F1 of the elliptical reflector 1, which is closest to the reflector. The light reflected from the reflector 1 is almost completely focused on the second focal point F2 of the elliptical reflector 1 remote or furthest from the reflector. The filament f of the light source 2 located at the first focal point F1 closest to the reflector 1 is actually imaged at the second focal point F2 furthest from the reflector.

Figure 3:
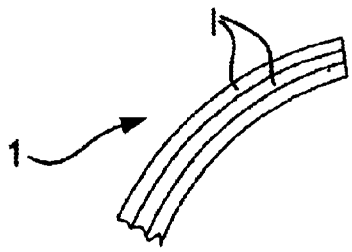
FIG. 3 is a detailed cutaway sectional view of an upper part of a reflector from the optical system shown in FIG. 1, which illustrates reflector structure.

The front surface of the reflector 1 is provided with a plurality of thin layers I. Because of this reflector structure visible portions of the incident radiation are reflected, but infrared radiation passes through the reflector, i.e. it is not reflected. A cutaway portion of the reflector 1 in the dashed circle III of FIG. 1 is shown in detail in FIG. 3, which shows the reflector structure, namely thin layers I.

Figure 2:
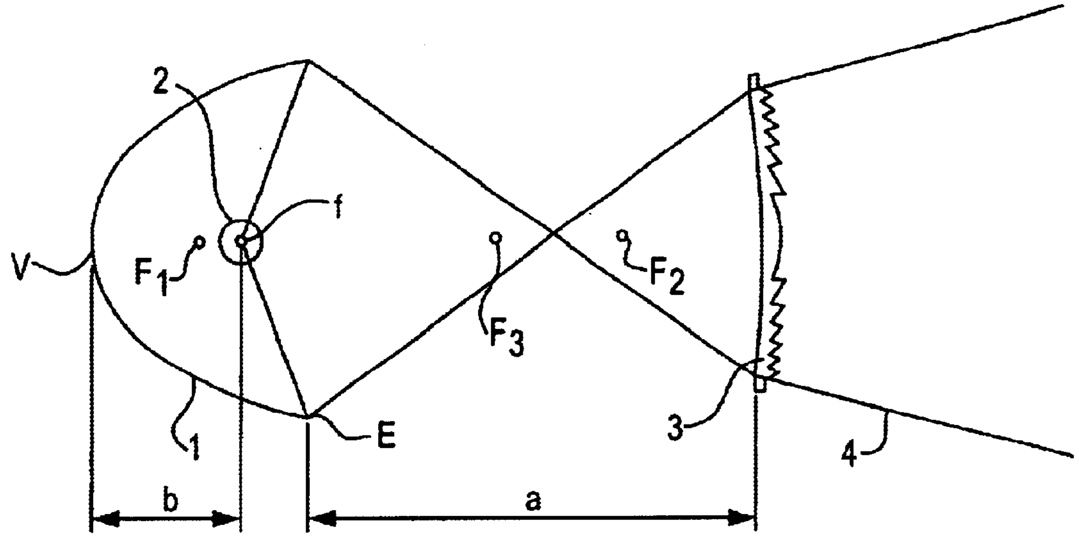
FIG. 2 is a schematic cross-sectional view of another embodiment of an optical system for a Fresnel lens light, which produces a floodlight.

FIG. 2 shows another embodiment of an optical system according to the invention for a Fresnel lens light that is arranged to produce a floodlight. This structure corresponds to the structure of the optical system shown in FIG. 1. The aperture angle of the light beam propagated from the Fresnel lens 3 can be arbitrarily increased by changing the distance b between the light source 2 and the vertex V of the reflector 1 and the distance a between the Fresnel lens 3 and the front edge E of the ellipsoidal reflector 1. So that the uniformity of the illumination intensity is maintained, the distance changes occur by a suitable constraining device (not shown in FIGS. 1 and 2). The light source 2 is arranged outside of the reflector-side first focal point F1. The focal point F3 of the Fresnel lens does not coincide with the second focal point F2 of the ellipsoidal reflector 1 furthest or remote from the reflector.

While the invention has been illustrated and described as embodied in an optical system for a Fresnel lens light, particularly for a spotlight or floodlight, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

What is claimed is:

1. An optical system for a Fresnel lens light, said optical system comprising an ellipsoidal reflector (10), at least one Fresnel lens (3) arranged at a variable distance (a) from a front edge (E) of said ellipsoidal reflector and a light source (2) arranged between said ellipsoidal reflector (10) and said at least one Fresnel lens (3);

wherein said light source (2) is arranged at a variable distance (b) from a vertex (V) of said elliptical reflector (10) to propagate a light beam and wherein said distance (b) between the ellipsoidal reflector (10) and said light source (2) is changeable to vary an aperture angle of the propagated light beam and said distance (a) is also changeable, but constrained in relation to said distance (b), so that illumination intensity of the propagated light beam is maintained uniform.

2. The optical system as defined in claim 1, wherein said ellipsoidal reflector (1) has a first focal point (F1) closest to said vertex (V) and a second focal point (F2) furthest from said vertex (V), said light source (2) has a filament and said light source is positionable so that said filament is located at said first focal point (F1) and said at least one Fresnel lens is positionable so that said second focal point (F2) coincides with a focal point (F3) of said at least one Fresnel lens so as to provide a spotlight.

3. The optical system as defined in claim 1, wherein said ellipsoidal reflector (1) has a first focal point (F1) closest to said vertex (V) and a second focal point (F2) furthest from said vertex (V), said light source (2) has a filaments, said light source is positionable so that said filament is positioned closer to said at least one Fresnel lens (3) than said first focal point (F1) and said at least one Fresnel lens is positionable so that said second focal point (F2) is closer to said at least one Fresnel lens (3) than a focal point (F3) of said at least one Fresnel lens so as to provide floodlight.

4. The optical system as defined in claim 1, wherein said at least one Fresnel lens receives nearly all reflected light from the reflector.

5. The optical system as defined in claim 1, wherein said ellipsoidal reflector (1) comprises any one of metallic material and transparent material provided with a reflective surface.

6. The optical system as defined in claim 5, wherein said ellipsoidal reflector (1) has respective surfaces on opposite sides thereof and at least one of said respective surfaces is provided with a plurality of thin layers (I).

7. The optical system as defined in claim 6, wherein one of said respective surfaces of said ellipsoidal reflector faces said at least one Fresnel lens and is a light-reflecting surface, said light-reflecting surface does not scatter incident light and is not structured to scatter said incident light and at least one surface of said at least one Fresnel lens is structured to scatter light that falls on said at least one Fresnel lens.

8. The optical system as defined in claim 6, wherein one of said respective surfaces of said ellipsoid reflector faces said at least one Fresnel lens and is a light-reflecting surface structured to scatter incident light.

9. The optical system as defined in claim 8, wherein at least one surface of said at least one Fresnel lens is structured to scatter light that falls on said at least one Fresnel lens.

10. A Fresnel lens light for film, stage, studio or photography, wherein said Fresnel lens light comprises an optical system and said optical system comprises an ellipsoidal reflector (10), at least one Fresnel lens (3) arranged at a variable distance (a) from a front edge (E) of said ellipsoidal reflector and a light source (2) arranged between said ellipsoidal reflector (10) and said at least one Fresnel lens (3);

wherein said light source (2) is arranged at a variable distance (b) from a vertex (V) of said elliptical reflector (10) to propagate a light beam and wherein said distance (b) between the ellipsoidal reflector (10) and said light source (2) is changeable to vary an aperture angle of the propagated light beam and said distance (a) is also changeable, but constrained in relation to said distance (b), so that illumination intensity of the propagated light beam is maintained uniform.

11. The Fresnel lens light as defined in claim 10, wherein said ellipsoidal reflector (1) has a first focal point (F1) closest to said vertex (V) and a second focal point (F2) furthest from said vertex (V), said light source (2) has a filament and said light source is positionable so that said filament is located at said first focal point (F1) and said at least one Fresnel lens is positionable so that said second focal point (F2) coincides with a focal point (F3) of said at least one Fresnel lens so as to provide spotlight.

12. The Fresnel lens light as defined in claim 10, wherein said ellipsoidal reflector (1) has a first focal point (F1) closest to said vertex (V) and a second focal point (F2) furthest from said vertex (V), said light source (2) has a filament and said light source is positionable so that said filament is positioned closer to said at least one Fresnel lens (3) than said first focal point (F1) and said at least one Fresnel lens is positionable so that said second focal point (F2) is closer to said at least one Fresnel lens (3) than a focal point (F3) of said at least one Fresnel lens so as to provide floodlight.

13. The Fresnel lens light as defined in claim 10, wherein said at least one Fresnel lens receives nearly all reflected light from the reflector.

14. The Fresnel lens light as defined in claim 10, wherein said ellipsoidal reflector (1) has respective surfaces on opposite sides thereof and at least one of said respective surfaces is provided with a plurality of thin layers (I).

15. The Fresnel lens light as defined in claim 14, wherein one of said respective surfaces of said ellipsoidal reflector faces said at least one Fresnel lens and is a light-reflecting surface, said light-reflecting surface does not scatter incident light and is not structured to scatter said incident light and at least one surface of said at least one Fresnel lens is structured to scatter light that falls on said at least one Fresnel lens.

16. The Fresnel lens light as defined in claim 14, wherein one of said respective surfaces of said ellipsoid reflector faces said at least one Fresnel lens and is a light-reflecting surface structured to scatter incident light.

17. The Fresnel lens light as defined in claim 16, wherein at least one surface of said at least one Fresnel lens is structured to scatter light that falls on said at least one Fresnel lens.

* * * * *